US005760321A

United States Patent [19]

Seabert

[11] Patent Number: 5,760,321

[45] Date of Patent: Jun. 2, 1998

[54] POWER-ACTUATED GUITAR STRING TUNING DEVICE

[76] Inventor: Frederick D. Seabert, 4230 E. Sells Dr., Phoenix, Ariz. 85018

[21] Appl. No.: 599,047

[22] Filed: Feb. 9, 1996

[51] Int. Cl.[6] .................................. G01D 3/00; G01D 3/14

[52] U.S. Cl. ........................ 84/312 R; 84/312 P; 84/313; 84/454

[58] Field of Search ............................ 84/312 R, 312 P, 84/313, 454, DIG. 18

[56] References Cited

U.S. PATENT DOCUMENTS

| | | | |
|---|---|---|---|
| 2,136,627 | 11/1938 | Lohman | 84/313 |
| 2,603,119 | 7/1952 | Dearth . | |
| 4,080,865 | 3/1978 | Gfell | 84/312 R |
| 4,426,907 | 1/1984 | Scholz | 84/454 |

*Primary Examiner*—William M. Shoop, Jr.
*Assistant Examiner*—Marlon T. Fletcher
*Attorney, Agent, or Firm*—Cahill, Sutton & Thomas, P.L.C.

[57] ABSTRACT

An automatic guitar string tuning device includes a foot-operated switch for controlling an electrical solenoid which rotates a cam shaft mounted upon a guitar or other stringed instrument. The solenoid rotates the cam shaft between first and second positions under the control of the foot switch. Several of the guitar strings are secured to tensioning arms which engage corresponding camming surfaces formed upon the rotating shaft. Rotation of the cam shaft between the first and second positions causes movement of the tensioning arms and thereby changes the pitch of the strings attached thereto.

6 Claims, 2 Drawing Sheets

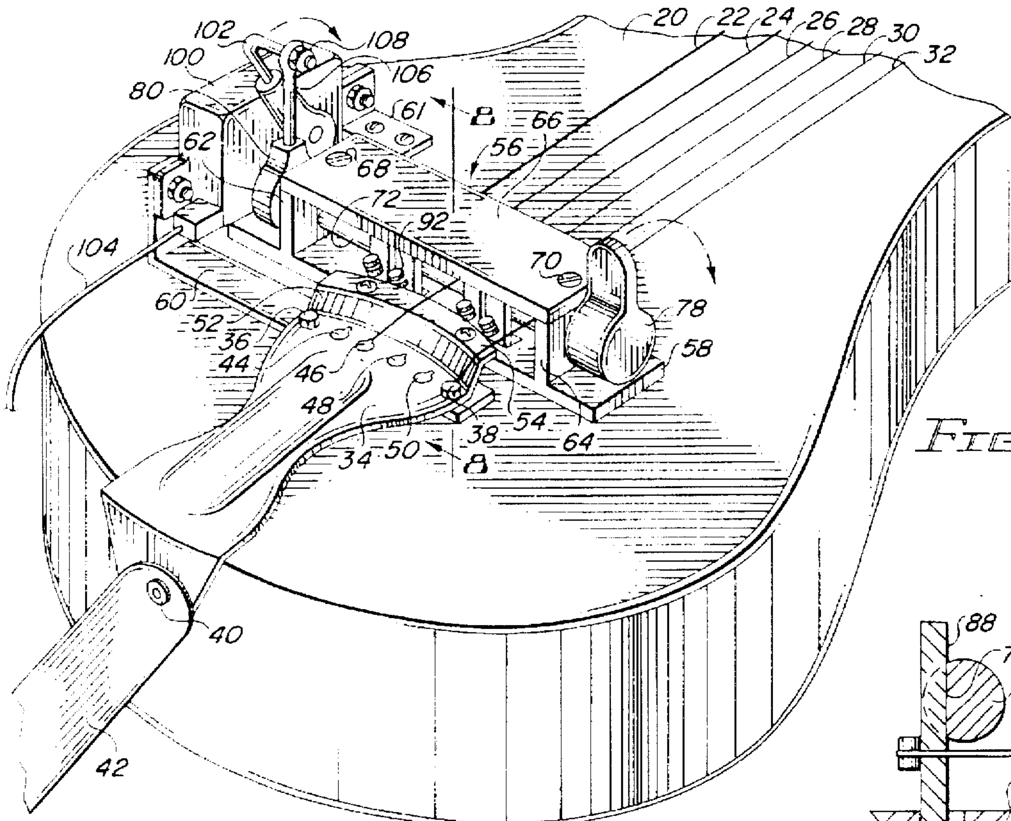
FIG-1
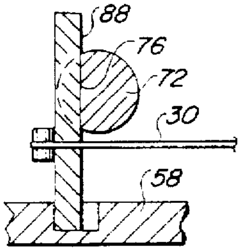
FIG-6
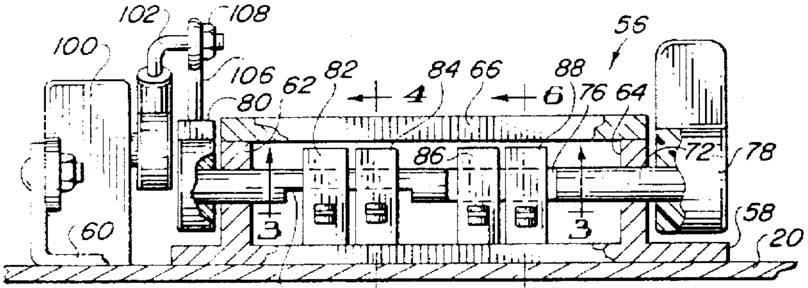
FIG-2
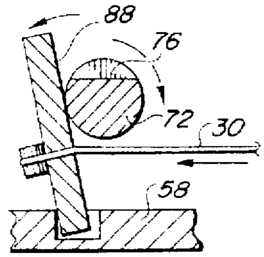
FIG-7
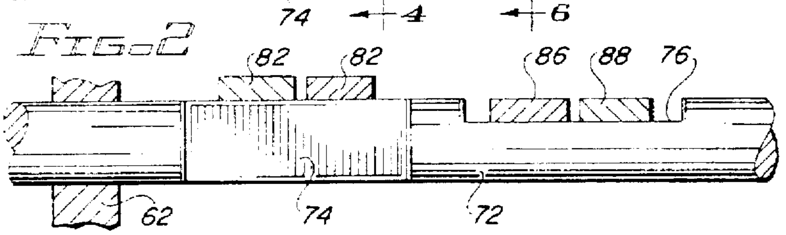
FIG-3
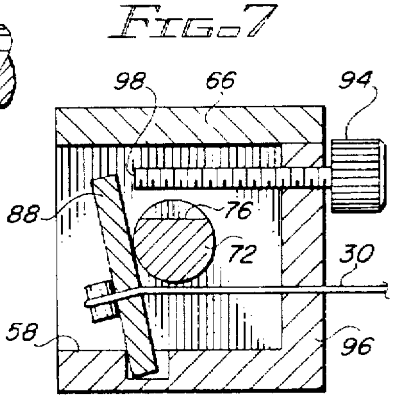
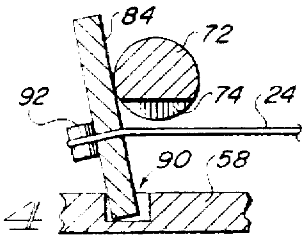
FIG-4
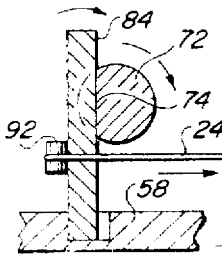
FIG-5
FIG-8

POWER-ACTUATED GUITAR STRING TUNING DEVICE

BACKGROUND OF THE INVENTION

1. Field of the Invention

The present invention relates generally to guitars and other stringed musical instruments, and more particularly, to devices used to quickly change the key or pitch of the strings between at least two predetermined settings.

2. Description of the Relevant Art

Six-stringed guitars typically include a set of six tuning keys located at the top of the neck of the guitar for allowing the strings of the guitar to be tuned. However, some guitarists require the ability to quickly change the pitch or key to which at least some of the strings are tuned. For example, a guitarist may wish to switch between so-called pedal steel tuning, Blue Grass tuning, and Hawaiian tuning.

U.S. Pat. No. 2,603,119 issued in 1952 to Dearth shows one such device that can be used to quickly change the pitch of three of the six strings. A handle can be moved between three positions to tune the guitar to A-natural, E-natural, or C-sharp. The handle rotates a cam shaft that engages three hinged levers to which the three variable tension strings are attached. As the handle is rotated, the cam shaft varies the tension applied to three of the six strings on the guitar. The device shown in the above-described U.S. Pat. No. 2,603,119 was embodied in a device that was sold commercially under the brand name "STRINGTONE" by Rowe Industries of Toledo, Ohio.

While the device shown in U.S. Pat. No. 2,603,119 permits a user to switch between one of three open chords, the user must stop picking or strumming the strings in order to manipulate the tuning handle to change the open chord to which the guitar is tuned. The requirement that the user operate the handle of the tuning device with his or her strumming hand limits the ability of the user to make rapid tuning changes in the middle of a song.

It is therefore an object of the present invention to provide an apparatus for rapidly varying the tension on the strings of a guitar or other musical instrument which does not require the use of the player's strumming hand to switch between open chords.

It is another object of the present invention to provide such an apparatus which can be operated by a user's foot remotely from the guitar.

It is still another object of the present invention to provide such an apparatus which can easily be switched between at least two open chords without requiring the user to stop playing the guitar.

A still further object of the present invention is to provide such an apparatus which allows a user to obtain sounds normally achieved only with a pedal steel guitar.

It is yet another object of the present invention to provide such an apparatus which can be manufactured and installed easily and inexpensively.

These and other objects of the present invention will become more apparent to those skilled in the art as the description of the present invention proceeds.

SUMMARY OF THE INVENTION

Briefly described, and in accordance with a preferred embodiment thereof, the present invention is a power-actuated string tuning device for varying the pitch of strings attached to a stringed musical instrument, and includes a cam shaft that is rotatably supported by bearings near the butt end of a guitar or other stringed musical instrument. The cam shaft includes a number of camming surfaces equal in number to the number of strings to be varied by such tuning device. Two or more tensioning arms are secured to the ends of a corresponding number of strings; each of these tensioning arms is adapted to be engaged by one of the camming surfaces of the cam shaft for varying the tension of the string attached to each such tension arm as the cam shaft is rotated between a first shaft position and a second shaft position.

The power-actuated string tuning device also includes an actuator that is coupled to the cam shaft for rotating the cam shaft between a first shaft position and a second shaft position. The actuator includes at least one control terminal for receiving an input signal having at least two states, corresponding to the first shaft position and second shaft position. The actuator is responsive to the state of the input signal for moving the cam shaft to either the first shaft position or the second shaft position, as selected by the input signal.

The input signal for the actuator is provided by a control switch operated by a user and coupled to the control terminal of the actuator for selecting between the first shaft position and the second shaft position of the cam shaft in order to vary the pitch of the affected strings.

In the preferred embodiment of the present invention, the actuator is provided in the form of an electrically-controlled solenoid, and the control switch reverses the polarity of an electrical voltage applied across the solenoid each time the control switch is operated to alternate the solenoid between two different positions. The control switch may conveniently be provided as a floor mounted foot switch that is activated by the user depressing such switch with the user's foot. Such switch may be a single-pole, double-throw toggle switch connected between a power supply and the solenoid, wherein operation of the foot switch toggles the polarity of the supply voltage applied to the solenoid. Within the preferred embodiment, the solenoid rotates a control arm between first and second control arm positions; a link rod extends between the control arm and the cam shaft for rotating the cam shaft as the control arm rotates.

While the actuator may be electrically-operated as described herein, the actuator may also be controlled pneumatically, as by application of air pressure or liquid pressure.

BRIEF DESCRIPTION OF THE DRAWINGS

FIG. 1 is a perspective view of the butt end of a guitar to which has been attached a tuning device constructed in accordance with the present invention.

FIG. 2 is an front view of the tuning device illustrating the cam shaft, bearings, string tensioning arms, and actuator.

FIG. 3 is an enlarged bottom view of the cam shaft and tensioning arms as viewed along the lines 3—3 shown in FIG. 2.

FIG. 4 is a sectional side view of the cam shaft, taken along lines 4—4 as shown in FIG. 2, as well as the tensioning arm for the fifth string of the guitar, and the fifth guitar string, all for a first shaft position wherein the fifth string is tuned to the note A.

FIG. 5 is a sectional side view, similar to that of FIG. 4, of the cam shaft, the tensioning arm for the fifth string of the guitar, and the fifth guitar string, all for a second shaft position wherein the fifth string is tuned down to the note G.

FIG. 6 is a sectional side view of the cam shaft, taken along lines 6—6 as shown in FIG. 2, as well as the tensioning arm for the second string of the guitar, and the second guitar string, all for the first shaft position wherein the second string is tuned to the note B.

FIG. 7 is a sectional side view, similar to that of FIG. 6, of the cam shaft, the tensioning arm for the second string of the guitar, and the second guitar string, all for the second shaft position wherein the second string is tuned up to the note C.

FIG. 8 is a sectional side view of the cam shaft, a tensioning arm, and a guitar string, but including an optional fine tuning set screw for adjusting the tension on the string when the cam shaft rotates in such manner to allow the string to assume the lower of the two pitches or notes that can be played by such string.

DETAILED DESCRIPTION OF THE PREFERRED EMBODIMENT

Figure 9:
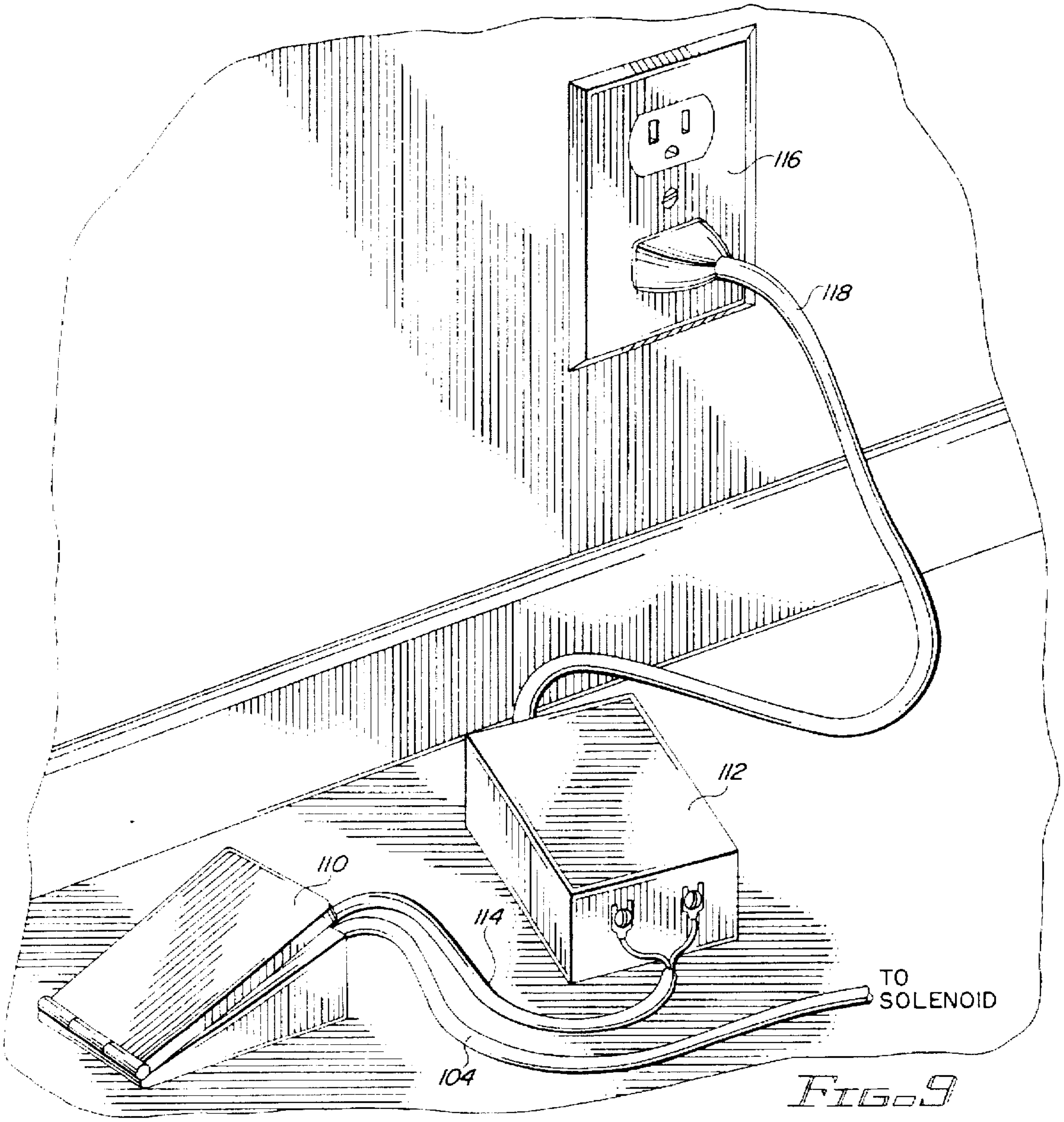
FIG. 9 is a perspective view of the foot switch and power supply used to alternate the polarity of a supply voltage applied across the solenoid to automatically move the cam shaft between the first and second shaft positions.

Within FIG. 1, the butt end of a guitar body is designated generally by reference numeral 20. In the preferred embodiment of the present invention, guitar 20 includes six strings 22–32. String 32 is commonly referred to as the first string, string 30 as the second string, string 28 as the third string, string 26 as the fourth string, string 24 as the fifth string, and string 22 as the sixth string. While a six-stringed guitar is shown in FIG. 1, the present invention could also be used with other stringed musical instruments.

Guitar 20 also includes a string anchor 34 secured to the upper panel of guitar body 20 by screws 36 and 38, and secured to the side panel of guitar body 20 by screw 40. As shown in FIG. 1, screw 40 may also serve as a mounting post for a support strap 42 used to support guitar 20 from a performer's body. Anchor 34 includes six string mounting holes including 44, 46, 48 and 50. Two additional string mounting holes are covered by mounting screws 36 and 38, which extend through such mounting holes. Ordinarily, the function of such mounting holes is to engage and anchor an end of one of the guitar strings. For example, in FIG. 1, mounting hole 46 is shown as being used to anchor an end of fourth string 26. Likewise, the mounting hole which is shown receiving mounting screw 38 is also used to anchor an end of first string 32. Anchor 34 also includes an upwardly extending flange 52 which supports a raised bridge 54 over which first string 32 and fourth string 26 extend. Bridge 54 supports such strings above the soundbox of guitar body 20 so that such strings may vibrate when plucked without contacting the soundbox of the guitar.

Still referring to FIG. 1, a power-actuated string tuning device, constructed in accordance with the teachings of the present invention, is designated generally by reference numeral 56 for selectively varying the pitch of second string 30, third string 28, fifth string 24, and sixth string 22. String tuning device 56 includes a base 58 which rests against, and is supported by, the upper panel of guitar body 20. Base 58 extends below and generally perpendicular to strings 22–32.

Base 58 is coupled to a mounting bracket 60 which is offset from base 58 but which extends parallel thereto. Mounting bracket 60 extends below anchor 34 and is secured to guitar body 20 by mounting screws 36 and 38. Additional support for tuning device 56 is provided by a further mounting bracket 61 secured to the upper panel of guitar body 20 by a pair of screws.

As shown in FIGS. 1 and 2, a pair of upstanding walls 62 and 64 extend from base 58 on opposing sides of strings 22–32. Cover 19 plate 66 extends between the upper ends of walls 62 and 64 above strings 22–32. Cover plate 66 is removably secured to the upper ends of walls 62 and 64 by screws 68 and 70.

Referring to FIGS. 1–3, tuning device 56 includes a cam shaft 72 that extends along a longitudinal axis parallel to base 58 and perpendicular to strings 22–32. Cam shaft 72 is supported for rotation at its opposing ends by circular holes drilled in walls 62 and 64. These holes serve as bearing surfaces for supporting cam shaft 72 for rotation about its longitudinal axis. Cam shaft 72 includes a plurality of camming surfaces. For example, cam shaft 72 includes a flattened camming surface 74 which affects sixth string 22 and fifth string 24. Cam shaft 72 also includes a flattened camming surface 76 which affects second string 30 and third string 28. A first cap 78 is secured over a first end of cam shaft 72 adjacent wall 64. A second cap 80 is secured to the opposing end of cam shaft 72 adjacent wall 62. Caps 78 and 80 prevent cam shaft 72 from sliding longitudinally but allow cam shaft 72 to rotate.

Tuning device 56 further includes four tensioning arms 82, 84, 86, and 88 for anchoring the ends of sixth string 22, fifth string 24, third string 28, and second string 30, respectively. As indicated in FIG. 4, tensioning arm 84 has a lower end supported within a channel 90 formed within base 58 to form a P hinged connection therebetween. Tensioning arm 54 has an aperture formed therethrough for allowing fifth string 24 to be threaded therethrough. The end of fifth string 24 extends about a retainer 92 that is too large to slip through the aperture formed in tensioning arm 84.

As shown best in FIGS. 4 and 5, the upper portion of tensioning arm 84 is engaged by cam shaft 72. FIGS. 4 and 5 show two different rotational positions of cam shaft 72. In FIG. 4, tensioning arm 84 is engaged by the rounded periphery of cam shaft 72, whereas in FIG. 5, cam shaft 72 has been rotated by 90 degrees, and tensioning arm 84 is engaged by the flattened camming surface 74 of cam shaft 72. As indicated in FIGS. 4 and 5, fifth string 24 is pulled more tightly when cam shaft 72 is in the position shown in FIG. 4 as compared with the position shown in FIG. 5. Thus, by rotating cam shaft 72 between the two rotational positions shown in FIGS. 4 and 5, the tension on fifth string 24, which is attached to tensioning arm 84, can be varied between two predetermined states to produce two different notes or pitches. For example, when cam shaft 72 is in the position shown in FIGS. 1–4, fifth string 24 might be tuned to the note A. However, when cam shaft 72 is rotated 90 degrees in the direction indicated in FIGS. 1 and 5, then the tension on the fifth string is reduced, and the fifth string is "tuned down" to the note G.

FIGS. 6 and 7 illustrate the opposite effect on second string 30. When cam shaft 72 is in its initial position shown by FIGS. 1–3 and FIG. 6, tensioning arm 88 engages flattened camming surface 76. In this position, second string 30 might be tuned to the note B. When cam shaft 72 rotates to its second position shown in FIG. 7, the tension on second string 30 is increased, and the second string is "tuned up" to the note C.

FIG. 8 illustrates an optional embodiment wherein a fine tuning adjustment screw can be used to set the pitch of second string 30. In this alternate embodiment, tuning screw 94 threadedly engages a downwardly extending front wall 96. Front wall 96 includes an opening through which second string 30 passes. By rotating the knurled head of screw 94, the tip 98 of the screw can be advanced or retracted. In this optional embodiment, when cam shaft 72 rotates counter-clockwise (relative to FIG. 8), tensioning arm 88 engages tip 98 of fine tuning adjustment screw 94 before contacting flattened camming surface As indicated above, one of the objects of the present invention is to provide tuning device 56 in a form which can easily be switched between at least two open chords without requiring the user to stop playing the guitar. For this purpose, an actuator 100 is provided for rotating cam shaft 72 between the first shaft position shown in FIGS. 1–4 and the second shaft position shown in FIGS. 5 and 7. Actuator 100 includes a control arm 102 which can be rotated back and forth, as indicated by the dashed arrow shown in FIG. 1. In the preferred embodiment of the present invention, actuator 100 includes an electrically-controlled solenoid; such solenoid may, for example, be of the type used for an electrically-controlled trunk lock mechanism of a Honda automobile, such as the Model TLS100 trunk lock solenoid available from NAPA Auto Parts. As shown in FIG. 1, an electrical cable 104 containing a pair of wires extends from actuator 100. By reversing the polarity of the voltage applied across such wires, in a manner described in greater detail below, actuator 100 can be driven to move control arm 102 toward a first control arm position directed toward the butt end of the guitar, or toward a second control arm position directed toward the neck end of the guitar.

Also shown in FIGS. 1 and 2 is a link rod 106 coupled between control arm 102 and an end of cam shaft 72 for rotating cam shaft 72 between the first and second cam shaft positions as actuator 100 rotates control arm 102. The upper end of link rod 106 is secured about the free end of control arm 102 by a nut 108 that threads onto the free end of control arm 102 while allowing link rod 106 to pivot thereabout. The lower end of link rod 106 is secured to cam shaft 72 for causing cam shaft 72 to rotate as link rod 106 is driven back and forth by control arm 102. and wherein said control switch selectively couples a supply voltage to the control terminal of said actuator for operating said solenoid.

Figure 10:
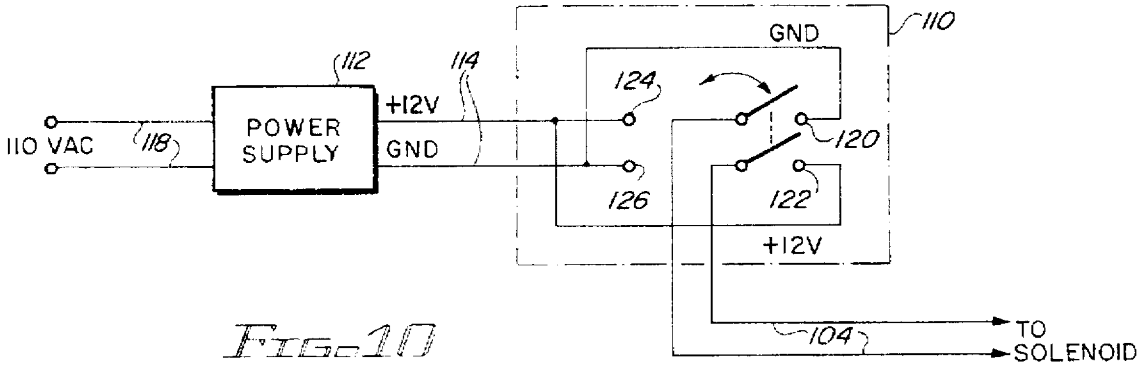
FIG. 10 is a circuit schematic showing the single-pole, double-throw electrical switch housed within the foot switch shown in FIG. 9.

Referring to FIGS. 9 and 10, a foot-operated control switch 110 is provided in the preferred embodiment of the present invention in order to select the position of cam shaft 72, and hence to select the open chord tuning of guitar 20. Actuator 100 (see FIG. 1) includes at least one, but preferably two, control terminals (not shown) for receiving an input signal in the form of a power supply voltage that can assume at least two different states. For example, in one such state, a positive 12 volts is applied across such control terminals to select a first shaft position; in the second state, a negative 12 volts is applied across such control terminals to select the second shaft position. The actuator 100 is responsive to the state of the input signal for moving cam shaft 72 to either the first shaft position or the second shaft position.

Foot switch 110 is coupled by electrical cable 104 to the control terminals of actuator 100 for providing the input signal that selects the control arm position. Thus, foot switch 110 can be depressed by a user's foot for selecting between the first shaft position and the second shaft position of said cam shaft in order to vary the pitch of said plurality of strings. Each time foot switch 110 is depressed, it reverses the polarity of the 12 volt supply voltage applied to the solenoid within actuator 100. Foot switch 110 receives a 12 volt supply voltage from power supply 112 via connection cable 114. In turn, power supply 112 is plugged into a wall outlet 116 by power cord 118. Power supply 112 may be a regulated 12-volt power supply of the type commercially available from Radio Shack under Catalog No. 22–20, rated at 2.5 Amps of current. Alternatively, a 12 volt rechargeable motorcycle battery may be used in place of power supply 112 when an electrical outlet is not available.

FIG. 10 is a circuit schematic that indicates the switching connections performed by foot switch 110. Preferably, foot switch 110 is a single-pole, double-throw, electrical switch that toggles between two alternating states each time such switch is operated. In the first state, switch 110 couples the first and second conductors of cable 104 to ground terminal 120 and +12 volt terminal 122, respectively. In the second state, switch 110 couples the first and second conductors of cable 104 to +12 volt terminal 124 and ground terminal 126.

While the present invention can be used with a variety of guitars, the inventor has found that the above-described tuning device is easily installed upon resonator style guitars available under the brand name Dobro. A performer may easily depress foot switch 110 to change the open chord tuning of guitar 20 without requiring the user to interrupt playing in order to make the change.

Those skilled in the art will now appreciate that an automatic tuning device has been described which allows the user to rapidly vary the tension on the strings of a guitar or other musical instrument without requiring the use of the player's strumming hand to switch between open chords. The described tuning device can be operated by a user's foot remotely from the guitar, and can easily be switched between at least two open chords without requiring the user to stop playing the guitar. Using the described tuning device allows the user to obtain sounds from a conventional six string guitar that are normally achieved only with a pedal steel guitar. Moreover, the described tuning device can be manufactured and installed easily and inexpensively.

While the present invention has been described with respect to a preferred embodiment thereof, such description is for illustrative purposes only, and is not to be construed as limiting the scope of the invention. While an embodiment using an electrical solenoid and an electrical switch has been described above, other power-actuated drive mechanisms may be used. For example, actuator 100 may be a pneumatically controlled device, in which case foot switch 110 might be replaced by a pneumatic valve, and power supply 112 might be replaced by a source of compressed air. Various other modifications and changes may be made to the described embodiments by those skilled in the art without departing from the true spirit and scope of the invention as defined by the appended claims.

I claim:

1. A power-actuated string tuning device for varying the pitch of strings attached to a stringed musical instrument between two or more discrete tuning positions, said device comprising in combination:

a. a cam shaft extending along a longitudinal axis, and including a plurality of camming surfaces;

b. bearing means for supporting said cam shaft for rotation about its longitudinal axis;

c. a plurality of tensioning arms secured to a corresponding plurality of strings, each of said tensioning arms being engaged by one of said plurality of camming surfaces of said cam shaft for varying the tension of the string attached to each of said tensioning arms;

d. a power-actuated drive mechanism coupled to said cam shaft for rotating said cam shaft between a first shaft position and a second shaft position, said power-actuated drive mechanism including at least one control terminal for receiving an input signal having at least two states, said power-actuated drive mechanism being responsive to the state of the input signal for moving said cam shaft to either the first shaft position or the second shaft position; and e. a control switch operated by a user and coupled to the control terminal of the power-actuated drive mechanism for providing said input signal and for selecting between the first shaft position and the second shaft position of said cam shaft in order to vary the pitch of said plurality of strings.

2. The power-actuated string tuning device described by claim 1 wherein said power-actuated drive mechanism includes an electrically-controlled solenoid, and wherein said control switch selectively couples a supply voltage to the control terminal of said power-actuated drive mechanism for operating said solenoid.

3. The power-actuated string tuning device described by claim 2 wherein said control switch reverses the polarity of the supply voltage applied to said solenoid each time said control switch is operated for rotating said cam shaft between its first shaft position and its second shaft position.

4. The power-actuated string tuning device described by claim 3 wherein said control switch includes a single-pole, double-throw, electrical switch that toggles between two alternating states each time such switch is operated, said first state applying a positive supply voltage across said solenoid, and said second state applying a negative supply voltage across said solenoid.

5. The power-actuated string tuning device described by claim 1 wherein said power-actuated drive mechanism includes a control arm that rotates through an arc between a first control arm position and a second control arm position, said power-actuated drive mechanism further including a link rod coupled between said control arm and said cam shaft for rotating said cam shaft as said control arm rotates.

6. The power-actuated string tuning device described by claim 1 wherein said control switch is a floor mounted foot switch activated by the user depressing such switch with the user's foot.

* * * * *